United States Patent
Gill et al.

(10) Patent No.: US 10,802,835 B2
(45) Date of Patent: Oct. 13, 2020

(54) RULE-BASED DATA PROTECTION

(71) Applicant: Nutanix, Inc., San Jose, CA (US)

(72) Inventors: Binny Sher Gill, San Jose, CA (US);
Naveen Kumar, Bangalore (IN);
Ranjan Parthasarathy, Milpitas, CA (US)

(73) Assignee: NUTANIX, INC., San Jose, CA (US)

( * ) Notice: Subject to any disclaimer, the term of this patent is extended or adjusted under 35 U.S.C. 154(b) by 219 days.

(21) Appl. No.: 15/842,837

(22) Filed: Dec. 14, 2017

(65) Prior Publication Data

US 2019/0332485 A1 Oct. 31, 2019

Related U.S. Application Data

(60) Provisional application No. 62/434,456, filed on Dec. 15, 2016.

(51) Int. Cl.
*G06F 9/445* (2018.01)
*H04L 29/08* (2006.01)
(Continued)

(52) U.S. Cl.
CPC ........ *G06F 9/44505* (2013.01); *G06F 3/0482* (2013.01); *G06F 3/0484* (2013.01);
(Continued)

(58) Field of Classification Search
CPC .................................................. G06F 11/1451
See application file for complete search history.

(56) References Cited

U.S. PATENT DOCUMENTS 7,343,453 B2 * 3/2008 Prahlad ................. G06F 3/0605
711/117
7,406,053 B2 7/2008 Cheung et al.
(Continued)

OTHER PUBLICATIONS

Non-Final Office Action dated Apr. 30, 2019 for U.S. Appl. No. 15/842,698, 15 pages.
(Continued)

*Primary Examiner* — Dawaune A Conyers
(74) *Attorney, Agent, or Firm* — Foley & Lardner LLP

(57) ABSTRACT

Systems for rule-based data protection of virtualized computing entities. A method embodiment commences upon receiving specification parameters that correspond to one or more data protection schemes or data protection configurations such as schemes for making backups or snapshots. Based on the specification parameters and the data protection configurations, one or more resource entities associated with the data protection configurations are identified. Each of the resource entities are accessed and one or more applicable data protection administration rules that correspond to the respective resource entities are applied. The resource entities might be organized hierarchically. Determination of which data protection administration rules are applicable to the resource entities is based on the type of resource entity being considered. The combination of the resource entity type and respective applicable rules is used to generate entity-specific data protection commands. The entity-specific commands to administer the data protection configurations over the resource entities are executed.

28 Claims, 13 Drawing Sheets

(51) Int. Cl.

| | |
|---|---|
| *G06F 8/71* | (2018.01) |
| *G06F 3/0482* | (2013.01) |
| *G06F 3/0484* | (2013.01) |
| *G06F 16/27* | (2019.01) |
| *G06F 16/951* | (2019.01) |
| *G06F 9/54* | (2006.01) |
| *H04L 12/24* | (2006.01) |
| *H04L 29/06* | (2006.01) |
| *G06F 11/14* | (2006.01) |
| *G06F 9/455* | (2018.01) |
| *G06F 9/48* | (2006.01) |
| *G06F 9/50* | (2006.01) |
| *G06F 11/07* | (2006.01) |

(52) U.S. Cl.
CPC ............ *G06F 8/71* (2013.01); *G06F 9/45512* (2013.01); *G06F 9/4843* (2013.01); *G06F 9/505* (2013.01); *G06F 9/5027* (2013.01); *G06F 9/547* (2013.01); *G06F 11/0721* (2013.01); *G06F 11/0751* (2013.01); *G06F 11/0793* (2013.01); *G06F 11/1451* (2013.01); *G06F 16/27* (2019.01); *G06F 16/951* (2019.01); *H04L 41/28* (2013.01); *H04L 63/102* (2013.01); *H04L 63/20* (2013.01); *H04L 67/34* (2013.01); *G06F 9/5005* (2013.01); *G06F 2201/84* (2013.01); *H04L 67/10* (2013.01)

(56) References Cited

U.S. PATENT DOCUMENTS

| | | | |
|---|---|---|---|
| 7,433,951 B1 | 10/2008 | Waldspurger | |
| 7,783,666 B1 | 8/2010 | Zhuge et al. | |
| 7,861,247 B1 | 12/2010 | Santos et al. | |
| 8,234,650 B1 | 7/2012 | Eppstein et al. | |
| 8,296,419 B1 | 10/2012 | Khanna et al. | |
| 8,443,370 B2 | 5/2013 | Smith et al. | |
| 8,549,518 B1 | 10/2013 | Aron et al. | |
| 8,600,947 B1* | 12/2013 | Freiheit | G06F 11/1458 707/654 |
| 8,601,473 B1 | 12/2013 | Aron et al. | |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,473,799 B1 | 10/2016 | Mentz et al. | |
| 9,575,784 B1 | 2/2017 | Aron et al. | |
| 9,612,815 B1 | 4/2017 | Jagtap et al. | |
| 9,619,257 B1 | 4/2017 | Aron et al. | |
| 9,654,511 B1* | 5/2017 | Brocco | H04L 63/102 |
| 9,772,866 B1 | 9/2017 | Aron et al. | |
| 10,026,070 B2 | 7/2018 | Thorpe et al. | |
| 10,104,170 B2 | 10/2018 | Sebbah et al. | |
| 10,430,293 B1* | 10/2019 | Skowronski | G06F 11/1458 |
| 2004/0122830 A1 | 6/2004 | Schwartz et al. | |
| 2006/0225065 A1* | 10/2006 | Chandhok | G06F 11/1458 717/168 |
| 2007/0220039 A1 | 9/2007 | Waldman et al. | |
| 2008/0134178 A1 | 6/2008 | Fitzgerald et al. | |
| 2008/0134193 A1 | 6/2008 | Corley et al. | |
| 2009/0183168 A1 | 7/2009 | Uchida | |
| 2010/0145929 A1 | 6/2010 | Burger et al. | |
| 2011/0096687 A1 | 4/2011 | Döttling et al. | |
| 2012/0166977 A1 | 6/2012 | Demant et al. | |
| 2012/0203911 A1 | 8/2012 | London et al. | |
| 2012/0254719 A1 | 10/2012 | Hackmann et al. | |
| 2012/0291042 A1 | 11/2012 | Stubbs et al. | |
| 2013/0007753 A1 | 1/2013 | Jain | |
| 2014/0046638 A1 | 2/2014 | Peloski | |
| 2014/0244842 A1 | 8/2014 | Rosensweig et al. | |
| 2014/0282518 A1 | 9/2014 | Banerjee | |
| 2014/0282586 A1 | 9/2014 | Shear et al. | |
| 2015/0121520 A1 | 4/2015 | Tsien et al. | |
| 2015/0135185 A1 | 5/2015 | Sirota et al. | |
| 2016/0055026 A1 | 2/2016 | Fitzgerald et al. | |
| 2016/0179416 A1* | 6/2016 | Mutha | G06F 3/0619 711/162 |
| 2016/0188594 A1 | 6/2016 | Ranganathan | |
| 2018/0007060 A1 | 1/2018 | Leblang et al. | |
| 2018/0018082 A1 | 1/2018 | Sarbin et al. | |
| 2018/0063017 A1 | 3/2018 | Beveridge | |

OTHER PUBLICATIONS

U.S. Appl. No. 15/818,704, filed Nov. 20, 2017, 71 pages.
"What are protocol buffers?". Google Developers. Sep. 5, 2017. 2 pages.
Wikipedia. "Anonymous function". Sep. 16, 2017. 38 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Apr. 26, 2019 for US Appl. No. 15/842,869, 17 pages.
Cano, Ignacio, et al. "Curator: Self-Managing Storage for Enterprise Clusters" (Mar. 27, 2017), from https://www.usenix.org/conference/nsdi17/ (16 pages).

* cited by examiner

RULE-BASED DATA PROTECTION

RELATED APPLICATIONS

The present application claims the benefit of priority to U.S. Patent Application Ser. No. 62/434,456 titled "INTENT FRAMEWORK", filed on Dec. 15, 2016, which is hereby incorporated by reference in its entirety; and the present application is related to co-pending U.S. patent application Ser. No. 15/842,698 titled "RESOURCE STATE ENFORCEMENT", filed on even date herewith, which is hereby incorporated by reference in its entirety; and the present application is related to co-pending U.S. patent application Ser. No. 15/842,436 titled "SPECIFICATION-BASED COMPUTING SYSTEM CONFIGURATION", filed on even date herewith, which is hereby incorporated by reference in its entirety; and the present application is related to co-pending U.S. patent application Ser. No. 15/842,869 titled "USER INTERFACE VIEW GENERATION", filed on even date herewith, which is hereby incorporated by reference in its entirety; and the present application is related to co-pending U.S. patent application Ser. No. 15/842,714 titled "ACCESSING COMPUTING RESOURCE ATTRIBUTES OF AN EXTERNAL SERVICE PROVIDER", filed on even date herewith, which is hereby incorporated by reference in its entirety.

BACKGROUND

Modern virtualized computing systems can comprise a broad variety of heterogeneous resource entities such as virtual machines (VMs), virtual disks (vDisks), virtual network interface cards (vNICs), executable containers (ECs), and/or other resource entities. In some cases, a single computing system might comprise scores of computing nodes that in turn host hundreds or even thousands of such resource entities. Certain collections of resource entities are often hierarchically associated. For example, a particular VM "parent" resource entity might be associated with a vNIC "child" resource entity and a vDisk "child" resource entity.

Such resource entities and/or their entity-specific configurations can change frequently over time. To maintain availability of resource entities and/or the data associated with the resource entities to a given degree of data protection (e.g., a degree or level according to some service level agreement (SLA)), an ongoing data protection scheme is implemented in the host computing system. For example, a system administrator might specify daily or weekly data snapshotting and/or backups.

Unfortunately, common techniques for administering data protection schemes, such as performing incremental snapshots and/or performing full backups, often waste precious computing resources. Wastefulness when carrying-out data protection schemes often occurs when a set of data to be backed-up is made up of constituent components that have differing characteristics, such as, for example, where some resource types change rapidly (e.g., folders that hold rapidly-changing files) while some other resource types change more slowly or not at all (e.g., folders that hold files such as binaries of an application). This is because when one particular data protection scheme is applied over both types of disparate data at the frequency that is required to address the high volume of changes that occur to the rapidly-changing resource types, this would mean that the slow changing data will be backed-up far more frequently than is needed. This problem often occurs in virtualized systems where, for example, a single data protection scheme is applied to all virtual machines as well as their constituent components even though the constituent components may include both fast-changing and slower-changing data.

What is needed is a technological solution that avoids wastefulness when performing backups, snapshots and/or other data protection operations in systems that host computing resources of different types.

SUMMARY

The present disclosure describes techniques used in systems, methods, and in computer program products for rule-based data protection, which techniques advance relevant technologies to address technological issues with legacy approaches. More specifically, the present disclosure describes techniques used in systems, methods, and in computer program products for rule-based administration of data protection configurations over heterogeneous resource entities in computing environments. Certain embodiments are directed to technological solutions for applying a rule base of data protection administration rules to data protection configuration specifications to determine entity-specific commands that administer data protection configurations to heterogeneous resource entities.

The disclosed embodiments modify and improve over legacy approaches. In particular, the herein-disclosed techniques provide technical solutions that address technical problems attendant to efficiently managing snapshotting and backup operations for large hierarchies of heterogeneous resource entities. Such technical solutions relate to improvements in computer functionality. Various applications of the herein-disclosed improvements in computer functionality serve to reduce demand for computer memory, reduce demand for computer processing power, reduce network bandwidth use, and reduce demand for inter-component communication. Specifically, rather than treating all computing resources the same by applying broad assignments of data protection schemes to those computing resources, the rule base of the herein disclosed techniques facilitates fine-grained classification of resource entities over which respective data protection rules are administered. Such rules can serve to reduce or eliminate redundant or otherwise wasteful data protection operations, thereby reducing or eliminating unnecessary consumption of computing resources (e.g., processor cycles, memory, network bandwidth, etc.).

The herein disclosed techniques further simplify development of data protection configurations for a particular computing system, thereby reducing demand on computing resources of the system by reducing or eliminating deployment of deficient data protection configurations. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to hyperconverged computing platform management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
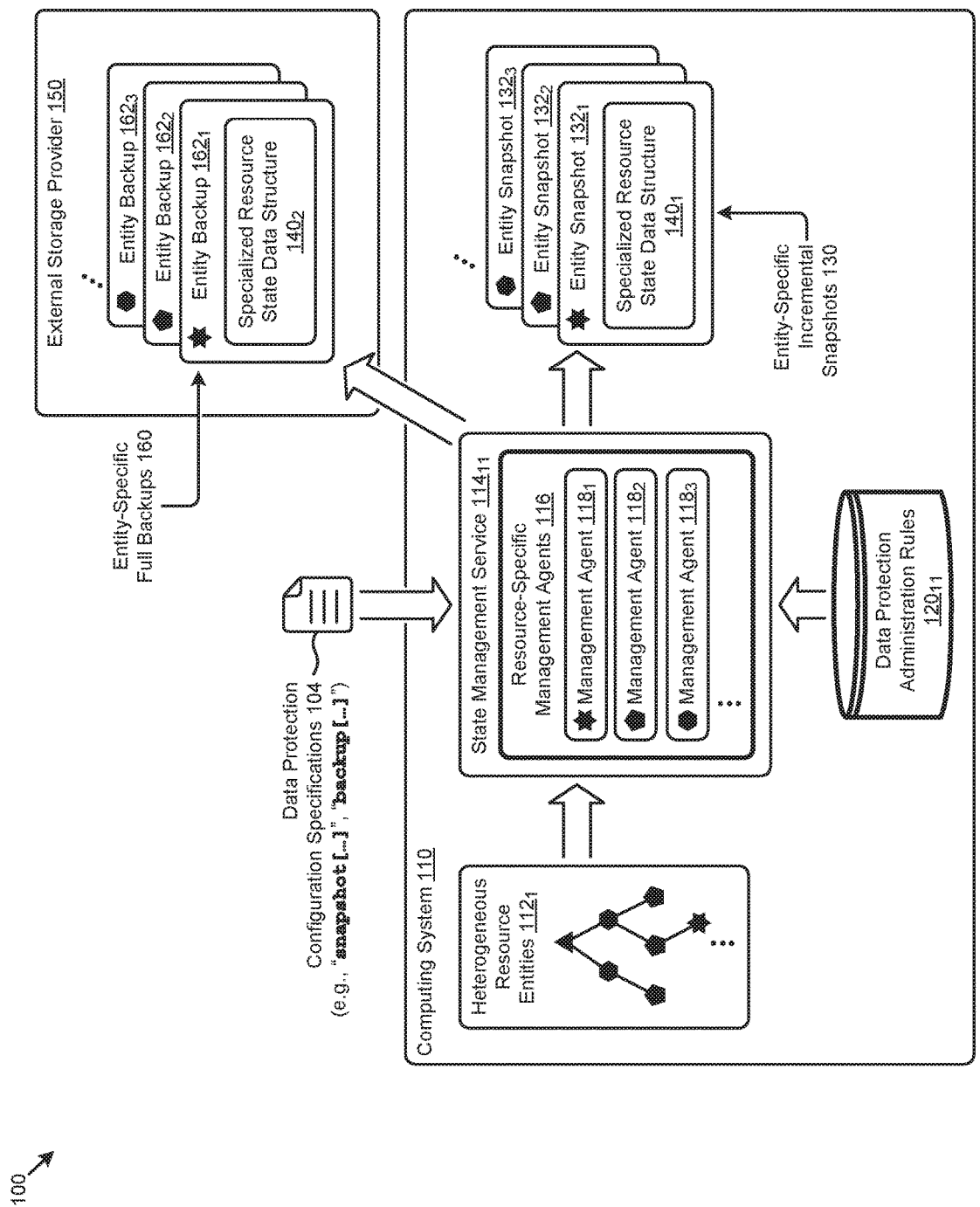
FIG. 1 illustrates a computing environment in which embodiments of the present disclosure can be implemented.

Embodiments in accordance with the present disclosure address the problem of efficiently managing snapshotting and backup operations for large hierarchies of heterogeneous resource entities. Some embodiments are directed to approaches for applying a rule base of data protection administration rules to data protection configuration specifications to determine entity-specific commands that administer data protection configurations to heterogeneous resource entities. The accompanying figures and discussions herein present example environments, systems, methods, and computer program products for rule-based administration of data protection configurations over different types resource entities in computing environments.

Overview

Disclosed herein are techniques for applying a set of data protection administration rules to data protection configuration specifications to determine entity-specific commands that administer data protection configurations over a hierarchy of heterogeneous resource entities. In certain embodiments, a set of specification parameters that describe one or more data protection configurations are received. The specification parameters are analyzed to determine the covered resource entities, their respective entity types, and a respective set of data protection operations that apply to the covered resource entities. A rule base of data protection administration rules is consulted to generate entity-specific commands to carry out data protection operations over the covered resource entities. The generated entity-specific commands are then executed to administer data protection configurations to the resource entities.

In certain embodiments, data protection operations are dispatched to a set of resource-specific management agents that correspond to the entity types of the resource entities. In certain embodiments, data protection operations comprise snapshot operations and/or backup operations, and/or any form or forms of replication operations. In certain embodiments, entity-specific commands capture the target states, the current states, the incremental data, or the complete data, of the resource entities. In certain embodiments, entity-specific commands for a subject resource entity are performed over a hierarchy of resource entities associated with the subject resource entity. In certain embodiments, entity-specific commands interact with internal APIs and/or external APIs.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

In computing environments such as computing environment 100, one or more clients (e.g., users, computing processes, etc.) of a computing system 110 might want to configure certain data protection schemes for a set of heterogeneous resource entities $112_1$ in the system. Such heterogeneous resource entities might include virtual machines (VMs), virtual disks (vDisks), virtual network interface cards (vNICs), executable containers (ECs), and/or other resource entities each configured for a particular purpose.

In most cases, one particular type of resource entity is owned by and/or hierarchically related to one or more hierarchically higher levels of other entities. For example, a vDisk is often owned or otherwise hierarchically related to a virtual machine, and a virtual machine is owned or otherwise hierarchically related to an application, and an application often owned or otherwise hierarchically related to a node, and a node is often owned or otherwise hierarchically related to a computing system, and a computing system is often owned or otherwise hierarchically related to a data center, etc. As such, referring to one entity in a hierarchy is sufficient to be able to traverse through the hierarchy so as to visit all of the different types of resource entities interspersed throughout the hierarchy. Such relationships are depicted in FIG. 1 as heterogeneous resources $112_1$.

Providing different handling of data protection (e.g., snapshots and backups) for different types of resources leads to reduction or elimination of redundancies. This is because, when encountering each individual resource entity that is interspersed throughout the hierarchy, each individual resource entity type has a respective handler type that is aware of the different characteristics of the particular resource entity type being encountered, and can thus be processed differently. This offers great flexibility and computing resource savings when performing data protection operations over different types of resource entities. More specifically, if a particular handler type that is aware of the different characteristics of the particular resource entity type being encountered when traversing through entities in a hierarchy, each particular resource entity type can be handled differently despite the fact that the different entities are in the same hierarchy.

One technique for implementing different handlers that are aware of the different characteristics of the particular resource entity type being encountered involves use of entity-specific agents. Entity-specific agents are specially-constructed segments of executable code, where the function of an entity-specific agent is specific to a particular entity type. An entity-specific agent can access and process any of the data protection rules that are pertinent to its entity type. Additionally, an entity-specific agent can perform entity-specific processing that goes beyond mere processing of data protection rules. For example, an entity-specific agent can access metadata for a particular entity even without any requirement that any such metadata access is indicated in a rule. For this reason and others, it happens that the executable code for a first entity-specific agent pertaining to a first entity type performs functions that are different from the executable code for a second entity-specific agent pertaining to a second entity type. For example, a first entity-specific agent might include capabilities to perform operations that are particular to virtual machines and/or for performing data protection operations that are particular to a virtual machine, while a second entity-specific agent might include capabilities that are particular to vDisks and/or are particular to performing data protection operations over a virtual disk. Additional embodiments, functions, and uses of entity-specific agents as entity-specific handlers is provided in the discussion of FIG. 3A.

As shown, heterogeneous resource entities $112_1$ are often hierarchically associated. For example, a particular VM "parent" resource entity might be associated with a vNIC "child" resource entity and a vDisk "child" resource entity. The aforementioned data protection schemes are implemented in computing system 110 to maintain availability of resource entities and/or the data associated with resource entities to a given level or requirement (e.g., according to some service level agreement (SLA)).

The herein disclosed techniques address the deficiencies of such approaches as illustrated in FIG. 1. Specifically, the techniques disclosed herein apply a set of data protection administration rules $120_{11}$ to data protection configuration specifications 104 to determine entity-specific commands that administer data protection configurations over a hierarchy of heterogeneous resource entities $112_1$. As such, when traversing a hierarchy of resource entities so as to implement a data protection scheme, a first set of data protection techniques or rules can be applied to a first entity type, and a second set of data protection techniques or rules can be applied to a second entity type. This means that, for example, if objects of the first entity type exhibit a first frequency (e.g., high frequency) of changes.

In the embodiment of FIG. 1, a state management service $114_{11}$ is implemented at computing system 110 to receive data protection configuration specifications 104 from one or more clients. The data protection configuration specifications 104 describe data protection configurations to apply to some or all of heterogeneous resource entities $112_1$.

For example, data protection configurations might identify certain data protection operations (e.g., snapshot, backup, replicate, etc.) to apply to certain selected instances of heterogeneous resource entities $112_1$. A set of resource-specific management agents 116 (e.g., management agent $118_1$, management agent $118_2$, management agent $118_3$, etc.) are implemented at state management service $114_{11}$ to process a respective portion of data protection configuration specification 104. For example, as illustrated by the icons in FIG. 1, the management agents correspond to a particular entity type (e.g., VM, vDisk, vNIC, etc.). Such management agents can be implemented in whole or in part by an "entity-specific agent" that comprises executable code specific to a corresponding entity type. The entity-specific agent and/or any other portions of code of the management agents can be configured at the time of instantiation to pertain to a respective particular entity type. For example, a management agent can be instantiated and invoked, for example, via a command line that includes a parameter that causes that instantiation to take on a personality unique to a particular entity type.

The resource-specific management agents 116 consult data protection administration rules $120_{11}$ to generate entity-specific commands to carry out the data protection operations over the resource entities. The generated entity-specific commands are then executed to enforce particular data protection regimes to the resource entities. For example, the entity-specific commands might call one or more instances of a snapshot service to generate a set of entity-specific incremental snapshots 130 (e.g., entity snapshot $132_1$, entity snapshot $132_2$, entity snapshot $132_3$, etc.) that are stored internally (e.g., in a local storage facility) to computing system 110. As another example, entity-specific commands might call one or more instances of a backup service to generate a set of entity-specific full backups 160 (e.g., entity backup $162_1$, entity backup $162_2$, entity backup $162_3$, etc.) that are stored externally (e.g., at an external storage provider 150) to computing system 110.

In some cases, the entity-specific commands might be performed over a hierarchy of resource entities associated with the subject resource entity. As can be observed, a specialized resource state data structure (e.g., specialized resource state data structure $140_1$ and specialized resource state data structure $140_2$) is implemented to facilitate certain efficiencies pertaining to the snapshots or backups. For example, as discussed in further detail as pertains to FIG. 3A, the specialized resource state data structure might capture target states, current states, incremental data, or the complete (e.g., full) data of the resource entities.

As can be understood from the foregoing discussion, a rule base comprising data protection administration rules $120_{11}$ facilitates fine-grained administration of data protection schemes over heterogeneous resource entities based at least in part on data protection configurations specified at a high abstraction level. As earlier mentioned, such rule-based techniques serve to reduce or eliminate redundant and/or conflicting data protection operations, thereby reducing or eliminating unnecessary consumption of computing resources (e.g., processor cycles, memory, network bandwidth, etc.). The high abstraction level of the data protection configurations further simplifies development of data protection configurations for a particular computing system, thereby reducing demand on computing resources of the system by reducing or eliminating the deployment of deficient data protection configurations.

One embodiment of such techniques for efficient rule-based data protection is disclosed in further detail as follows.

Figure 2:
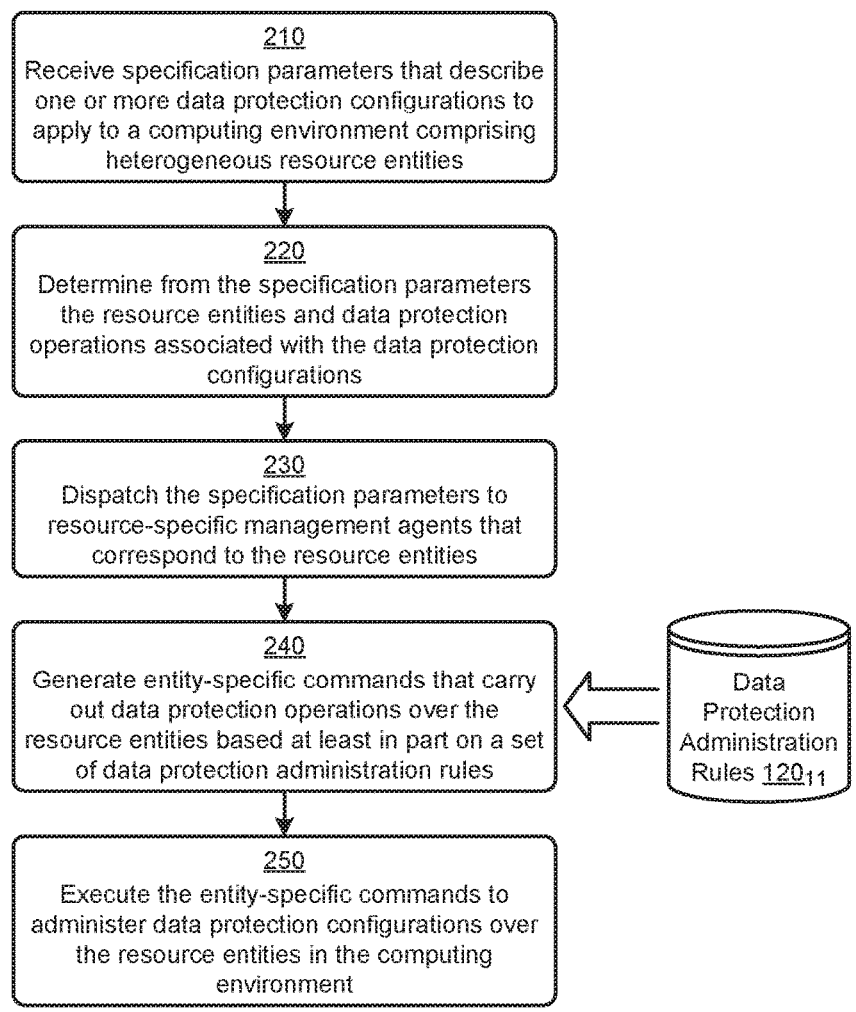
FIG. 2 depicts a rule-based data protection technique as implemented in systems that implement rule-based administration of data protection configurations over heterogeneous resource entities in computing environments, according to some embodiments.

FIG. 2 depicts a rule-based data protection technique 200 as implemented in systems that implement rule-based administration of data protection configurations over heterogeneous resource entities in computing environments. As an option, one or more variations of rule-based data protection technique 200 or any aspect thereof may be implemented in the context of the architecture and functionality of the embodiments described herein. The rule-based data protection technique 200 or any aspect thereof may be implemented in any environment.

The rule-based data protection technique 200 presents one embodiment of certain steps and/or operations that facilitate rule-based administration of data protection configurations over heterogeneous resource entities in computing environments. The rule-based data protection technique 200 can commence by receiving a set of specification parameters that describe one or more data protection configurations to apply to a computing environment comprising heterogeneous resource entities (step 210). The specification parameters are analyzed to determine the resource entities and respective data protection operations (e.g., snapshot, backup, replicate, etc.) associated with the data protection configurations (step 220). Certain portions of the specification parameters are dispatched to resource-specific management agents that correspond to the resource entities (step 230). For example, a portion of the specification parameters that pertain to virtual machines might be dispatched to a management agent that is configured to manage virtual machines.

A set of entity-specific commands are generated, based at least in part on a set of data protection administration rules (e.g., data protection administration rules $120_{11}$) to carry out data protection operations over the resource entities (step 240). As an example, the entity-specific commands for each entity type (e.g., VM, vDisk, vNIC, EC, etc.) can be generated at a respective resource-specific management agent corresponding to the entity type. The entity-specific commands are then executed (e.g., by data protection execution services) to administer the data protection configurations over the resource entities in the computing environment (step 250).

One embodiment of a system for implementing the rule-based data protection technique 200 and/or other herein disclosed techniques is disclosed as follows.

Figure 3A:
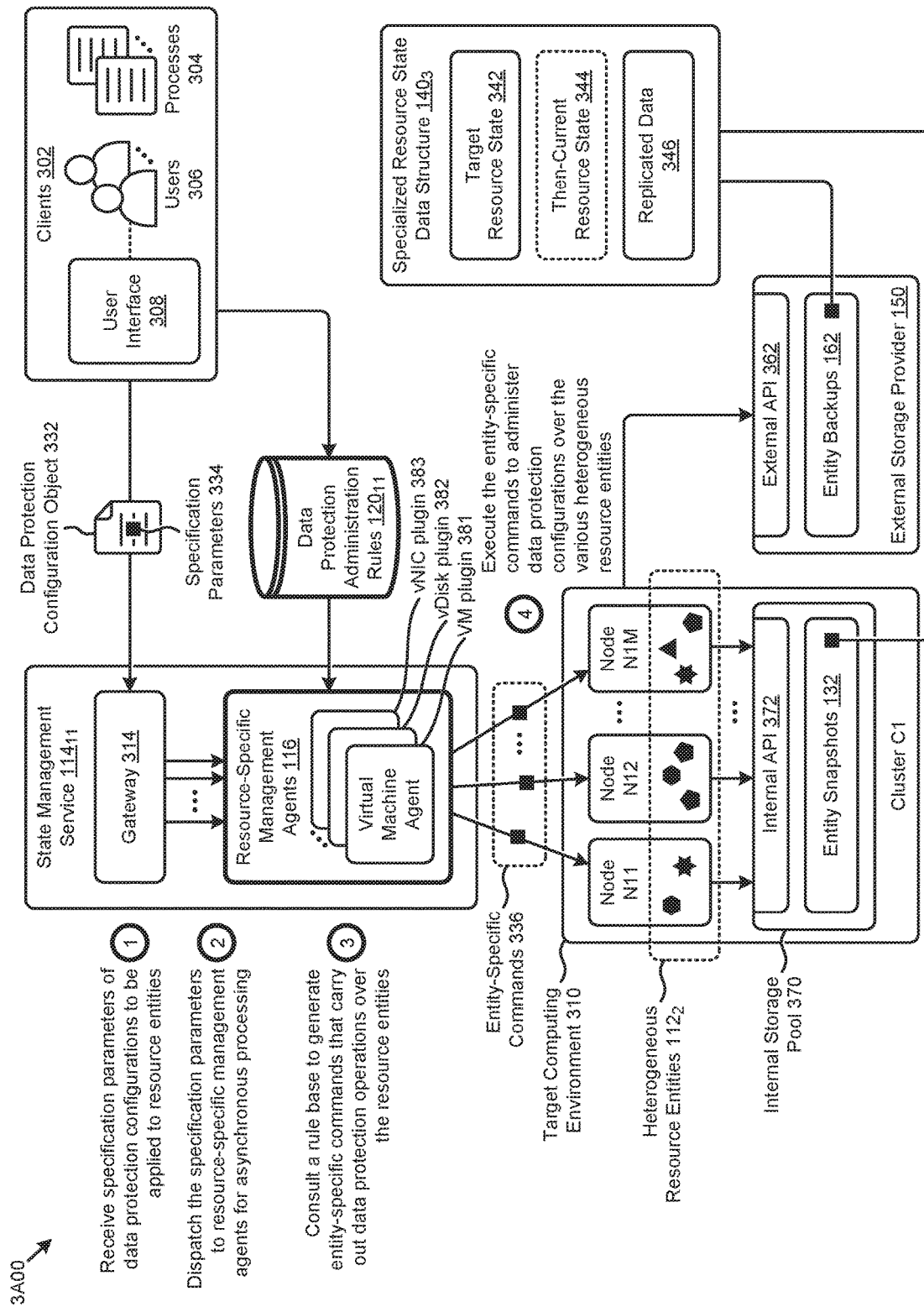
FIG. 3A is a block diagram of a data protection system that implements rule-based administration of data protection configurations over heterogeneous resource entities in computing environments, according to some embodiments.

FIG. 3A is a block diagram of a data protection system 3A00 that implements rule-based administration of data protection configurations over heterogeneous resource entities in computing environments. As an option, one or more variations of data protection system 3A00 or any aspect thereof may be implemented in the context of the architecture and functionality of the embodiments described herein. The data protection system 3A00 or any aspect thereof may be implemented in any environment.

The embodiment shown in FIG. 3A depicts merely one example of a computing system that supports rule-based administration of data protection configurations over heterogeneous resource entities in computing environments, according to the herein disclosed techniques. The components, data structures, and data flows shown in FIG. 3A present one partitioning and associated data manipulation approach. The specific example shown is purely exemplary, and other subsystems, data structures, and/or partitioning are reasonable.

Specifically, the data protection system 3A00 comprises an instance of a state management service (e.g., state management service $114_{11}$) that receives a set of specification parameters that describe data protection configurations to be applied to certain resource entities (operation 1). As can be observed, a set of specification parameters 334 codified in a data protection configuration object 332 (e.g., JSON object from a web form) might be received from one or more clients 302. The clients 302 might comprise one or more users 306 and/or one or more computing processes (e.g., processes 304) that issue various data protection configuration objects to the state management service $114_{11}$ to accomplish respective data protection purposes (e.g., perform snapshot operations, backup operations, etc.). For example, the data protection configuration object 332 and its associated specification parameters (e.g., specification parameters 334) might be issued to state management service $114_{11}$ from a user interface 308 of one of the users 306 to apply to the heterogeneous resource entities $112_2$ at a target computing environment 310 (e.g., a cluster "C1" that comprises node "N11", node "N12", . . . , node "N1M").

The specification parameters 334 are received at state management service $114_{11}$ by a gateway 314. The gateway 314 dispatches specification parameters 334 to one or more resource-specific management agents 116 (e.g., a virtual machine agent) to asynchronously process (e.g., for each entity type) the data protection operations associated with the data protection configurations (operation 2). Specifically, resource-specific management agents 116 consult a rule base of data protection administration rules $120_{11}$ to generate a set of entity-specific commands 336 that carry out data protection operations over the heterogeneous resource entities $112_2$ (operation 3).

As depicted, any of the resource-specific management agents such as the shown virtual machine agent might be implemented as a plugin. Some, or all of the resource-specific management agents can be implemented as a plugin. A particular entity-specific agent might be implemented as a corresponding plugin such as the shown VM plugin 381, vDisk plugin 382, and vNIC plugin 383.

As earlier indicated, an entity-specific agent can be used to perform entity-specific processing that goes beyond mere processing of data protection rules. As examples, an entity-specific agent such as the shown virtual machine agent can process VM entity metadata as well as other metadata of other entities of the computing system. A virtual machine agent can be aware of a wide range of conditions of the computing system as a whole. As one specific example, virtual machine agent can be aware of when a particular VM entity is in the midst of a migration to another node—and can thus decide to defer data protection operations until the VM has been successfully migrated. Or, virtual machine agent can be aware of when a particular VM entity is in the midst of a migration to another node, and can thus decide to issue entity-specific commands 336 to the node that is the target node of the migration.

The entity-specific commands that result from operation of the resource-specific management agents 116 are executed in the target computing environment 310 so as to administer data protection configurations over the various heterogeneous resource entities $112_2$ (operation 4).

As can be observed in FIG. 3A, entity-specific commands 336 might be executed at one or more nodes (e.g., "leader" nodes) in cluster C1 to generate a set of entity snapshots 132 at an internal storage facility (e.g., internal storage pool 370) through an internal API 372. In other cases, entity-specific commands 336 might invoke the creation of entity backups 162 at an external storage facility of an external storage provider 150) through an external API 362. The entity snapshots 132 and/or entity backups 162 can comprise a specialized resource state data structure $140_3$. Specifically, the specialized resource state data structure $140_3$ (e.g., database table, programming code object, etc.) can codify a target resource state 342, a then-current resource state 344, and/or a set of replicated data 346, for the particular entity corresponding to the snapshot or backup. In cases where there are no differences between target resource state 342 and the then-current resource state 344, the portion of the specialized resource state data structure $140_3$ associated with the then-current resource state 344 may not be populated with data. Furthermore, any of the components of the specialized resource state data structure $140_3$ can comprise a complete (e.g., full) set of data or an incremental (e.g., as compared to an earlier snapshot or backup) set of data.

The foregoing discussions describe techniques for applying a rule base to generate entity-specific commands to carry out certain data protection operations (e.g., step 240 of FIG. 2). Such a technique for carrying out snapshot operations is disclosed in further detail as follows.

Figure 3B:
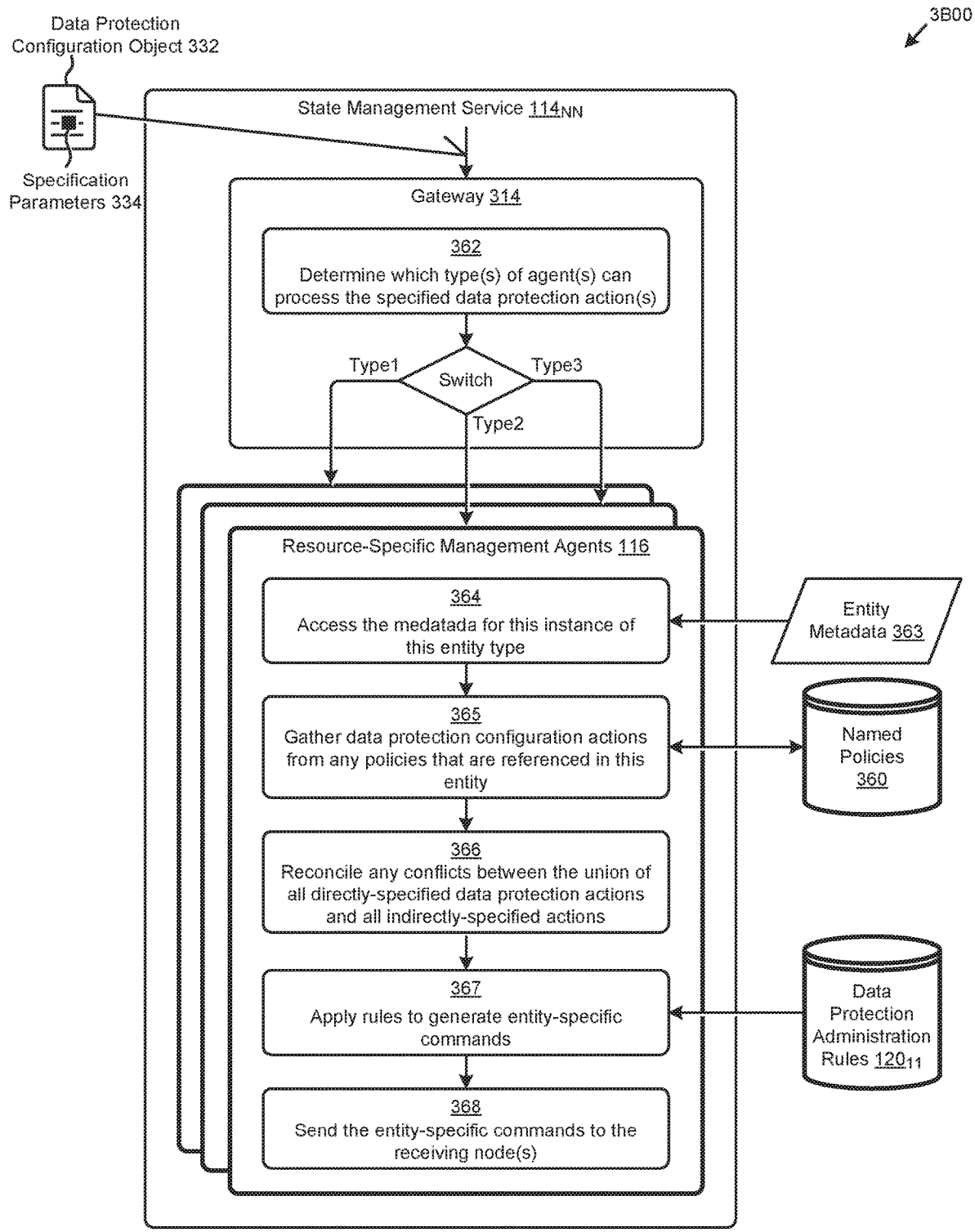
FIG. 3B presents a data flow that implements rule-based administration of data protection configurations over heterogeneous resource entities in computing environments, according to some embodiments.

FIG. 3B presents a data flow 3B00 that implements rule-based administration of data protection configurations over heterogeneous resource entities in computing environments. As an option, one or more variations of the data flow or any aspect thereof may be implemented in the context of the architecture and functionality of the embodiments described herein.

As discussed with respect to the foregoing FIG. 3A, the system is configured such that, given a data protection specification that is to be applied to a set of computing resource entities, the components of the system interact to as to perform data protection over those computing resource entities. In particular, components of the state management service interact such that entity-specific commands are delivered to the computing nodes where the entities are hosted. The state management service can be hosted on any node.

As shown, state management service $114_{NN}$ hosts and instance of gateway 314, which receives specification parameters 334. At step 362, the gateway parses the specification parameters, and determines, based on the parsing, which type or types of resource management agents are to be invoked. When one or more of the determined resource-specific management agents are invoked, then at step 364, the agent or agents access entity metadata 363 pertaining to the particular entity. For example, if the entity type is a virtual machine, then a virtual machine agent is invoked or, as another example, if the entity type is a virtual disk, then a virtual disk agent is invoked. In some cases, the applicable data protection configuration specifications are accessed directly from the received specification parameters. In other cases, portions of the applicable data protection configuration specifications are retrieved from metadata associated with the entity.

In still other cases, all or portions of the applicable data protection configuration specifications might be retrieved indirectly whenever a particular entity includes a reference to a named policy. For example, to implement access to a named policy from a reference given in a particular entity, at step 365, the metadata for that particular entity is checked to determine the occurrence of named policies (if any). By accessing the named policies 360, indirectly-referenced data protection configurations for this entity can be gathered. In some cases, a data protection administration rule might include logic to determine the location (e.g., based on the name of the named policy) and applicability of any data protection configurations in the policies. In some situations, an entity can refer to multiple named policies, and in some cases, the multiple named policies might include data protection configurations that are duplicative or in conflict. In such cases all of the data protection configurations of all of the named policies that are referred to by the entity are gathered. Then, operations such are depicted by step 366 serve to reconcile any conflicts or differences among the configurations. Such reconciliation might include selecting a dominating one of the respective data protection configuration specifications, or such reconciliation might include selecting multiple non-conflicting data protection configuration specifications.

Further details regarding general approaches to handling policies are described in U.S. Application Ser. No. 62/588, 880 titled "POLICY AGGREGATION", filed on Nov. 20, 2017, which is hereby incorporated by reference in its entirety.

At step 367, the rules are applied to the reconciled data protection configuration specifications so as to generate entity-specific commands, after which, at step 368, the commands are sent to the node that hosts the particular entity.

When generating entity-specific commands, specification parameter values are matched to a rule or rules from the data protection administration rules. This can be done by string matching. For example, if the given specification parameter includes a key/value pair such as "action/snapshot", then rules that include an "IF" clause having a predicate such as IF "action==snapshot" would fire. Specifically, the THEN portion of the rule is fired. The THEN portion of rules include commands or operands for commands that are then used to invoke entity-specific data protection operations on the particular entity.

The foregoing technique for matching data protection configuration specifications to Boolean predicates of rules so as to result in entity-specific data protection commands are further discussed infra. The entity-specific commands can be use in and/or, can refer to any of a variety of data protection techniques. Two of such techniques (e.g., data protection through snapshotting and data protection using full backups) are shown and described as pertaining to FIG. 4A and FIG. 4B.

Figure 4A:
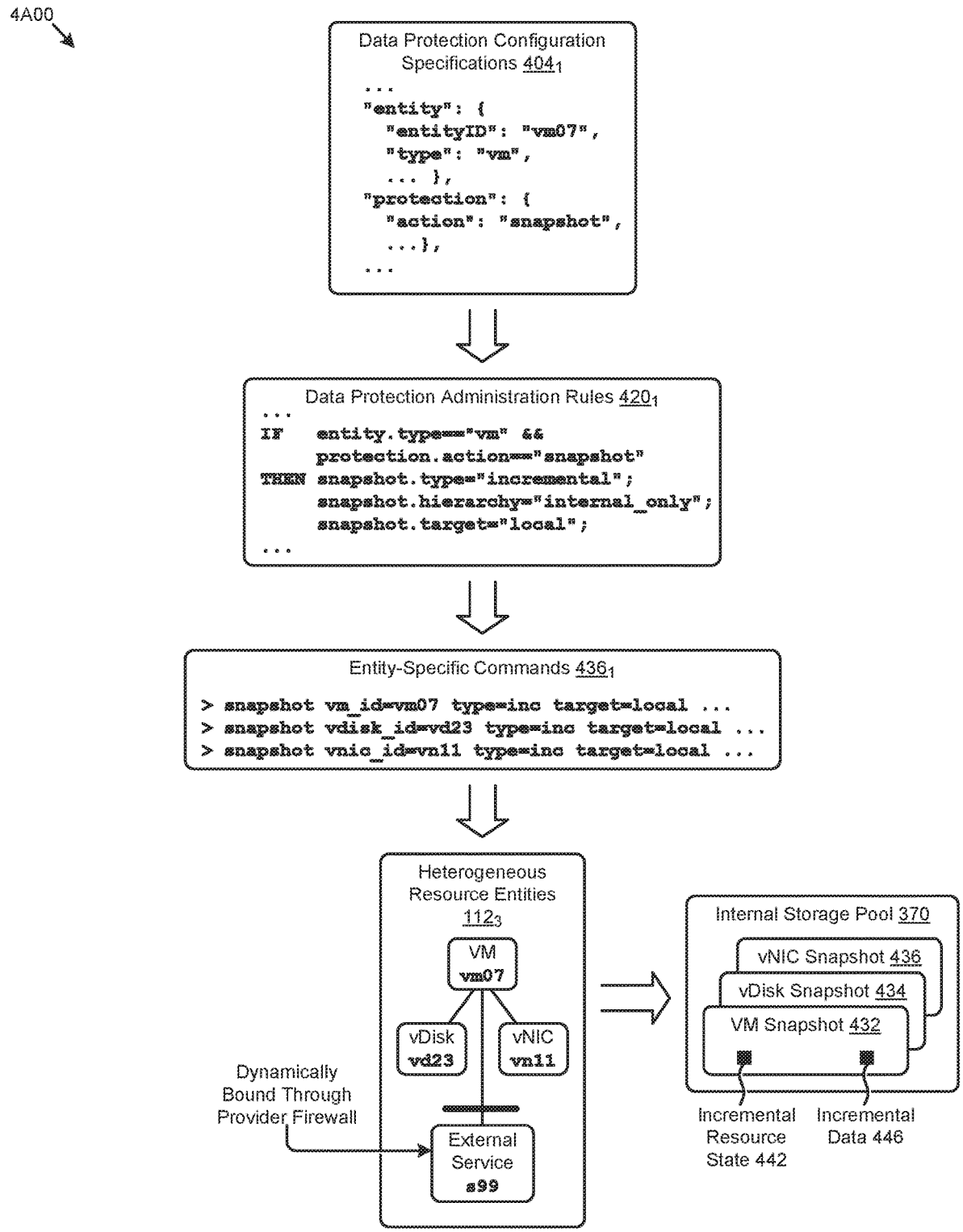
FIG. 4A presents a data snapshotting technique as implemented in systems that provide rule-based administration of data protection configurations over heterogeneous resource entities in computing environments, according to some embodiments.

FIG. 4A presents a data snapshotting technique 4A00 as implemented in systems that provide rule-based administration of data protection configurations over heterogeneous resource entities in computing environments. As an option, one or more variations of data snapshotting technique 4A00 or any aspect thereof may be implemented in the context of the architecture and functionality of the embodiments described herein. The data snapshotting technique 4A00 or any aspect thereof may be implemented in any environment.

The embodiment shown in FIG. 4A is merely one example of rule-based administration of a snapshotting data protection configuration according to the herein disclosed techniques.

An administrator might want to specify particular entities to be backed up or snapshotted in accordance with a particular set of rules. The administrator's specifications and corresponding rules can be combined so as to result in a set of entity-specific backup or snapshot rules, which can in turn be applied over the entire system. The different entities are treated differently so as to avoid redundant storage or other waste of computing resources.

As shown, a set of data protection configuration specifications $404_1$ describe a data protection configuration for a "vm" entity identified as "vm07". As can be observed, VM "vm07" is the parent resource entity of various child resource entities, namely vDisk "vd23", vNIC "vn11", and the shown external service "s99", all of which are members of heterogeneous resource entities $112_3$. The external service "s99" might be dynamically bound to VM "vm07" through a firewall associated with the provider of the external service.

The data protection configuration specifications $404_1$ call for a "snapshot" protection action for "vm07". The shown set of data protection administration rules $420_1$ indicate that for any VM snapshot (e.g., "entity.type=="vm" && protection.action=="snapshot""), the snapshot is to include "incremental" data snapshots of the hierarchy of "internal_only" resource entities underlying the subject VM. The rule also indicates that the resulting snapshot is to be stored in a "local" storage facility. Of course, "local" storage is merely one example. The destination of any output can be any storage location, such as in or on "remote" storage (e.g., a geographically distal node), or in or on "cloud" storage (e.g., in a cloud storage facility of a cloud storage provider).

The foregoing example follows the pattern for generating entity-specific commands whereby, when generating entity-specific commands, specification parameter values are matched to a rule or rules using string matching. In the shown example, the given specification parameters include the key/value pair "type"/"vm". Accordingly, rules that include an "IF" clause that includes the predicate "type==vm". The IF predicate would be evaluated. In this example, the IF predicate is a Boolean expression that includes an AND clause that evaluates to TRUE when "entity.type==vm" and also "protection.action==snapshot", which is TRUE in this example. The THEN portion of the rule includes an operand pertaining to a snapshot command. Specifically, and as shown, the entity-specific commands $436_1$ include the "string snapshot vm_id=vm07 type=inc target=local". Each portion of this string derives from either the data protection configuration specifications or from the data protection administration rules that are matched and fired. As such, a complete entity-specific command can be constructed from information included in the data protection configuration specifications in combination with information included in the THEN clause of a fired rule.

In some cases, the data protection administration rules might explicitly exclude any forms of dynamically bound external entities from a hierarchical data protection configuration so as to avoid security issues associated with accessing the external entities. More specifically, in some computing environments, values of external service parameters and other characteristics of external services can be dynamically and autonomously synchronized between the external service and the host computing system. In most cases, the external services are snapshotted or backed up in accordance with the specifications of the vendor of the external service. In many cases, external service parameters are intended to be strictly read-only, and thus are not intended to be written to in the context of a restore from a backup or snapshot.

Further details regarding general approaches to handling external service parameters are described in U.S. application Ser. No. 15/842,714 titled "ACCESSING COMPUTING RESOURCE ATTRIBUTES OF AN EXTERNAL SERVICE PROVIDER", filed on even date herewith, and which is hereby incorporated by reference in its entirety.

Based at least in part on applying data protection administration rules $420_1$ to the data protection configuration specifications $404_1$, entity-specific commands $436_1$ are generated. Specifically, the entity-specific commands $436_1$ comprise "snapshot" commands for VM "vm07" and the internal resource entities (e.g., vDisk "vd23" and vNIC "vn11") in the hierarchy of VM "vm07". No commands are generated for external service "s99" as such operations are explicitly constrained by the "internal_only" rule of data protection administration rules $420_1$. Executing entity-specific commands $436_1$ over the foregoing resource entities creates a set of snapshots for each entity (e.g., VM snapshot 432, vDisk snapshot 434, and vNIC snapshot 436) in internal storage pool 370. Since the snapshot type is "incremental", each of the aforementioned resource entity snapshots comprises data describing an incremental resource state 442 as well as a set of incremental data 446 that is associated with the resource entity.

Another data protection technique involves a full backup. One possible embodiment of a backup technique is shown and discussed as pertains to the following FIG. 4B.

Figure 4B:
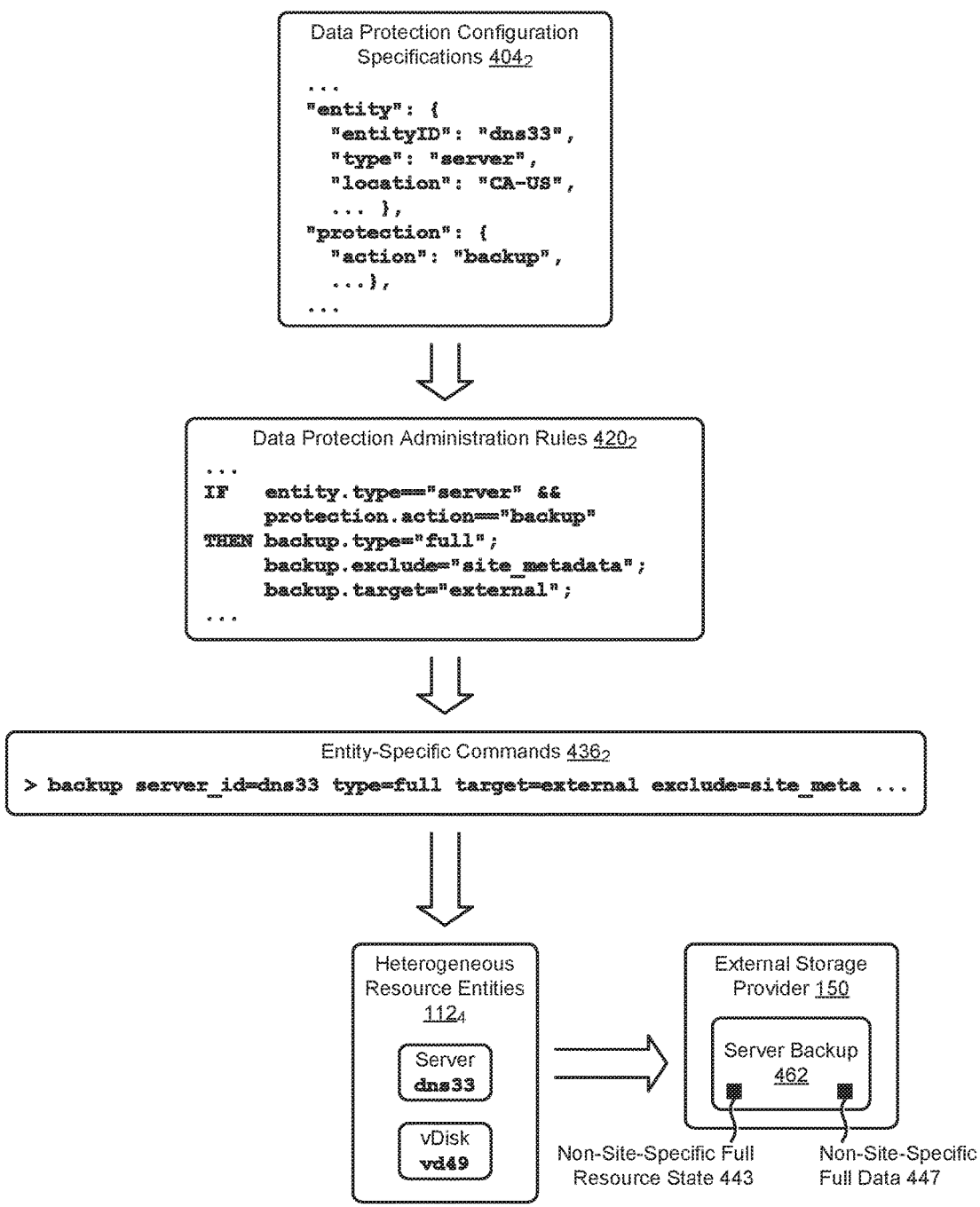
FIG. 4B presents a data backup technique as implemented in systems that provide rule-based administration of data protection configurations over heterogeneous resource entities in computing environments, according to some embodiments.

FIG. 4B presents a data backup technique 4B00 as implemented in systems that provide rule-based administration of data protection configurations over heterogeneous resource entities in computing environments. As an option, one or more variations of data backup technique 4B00 or any aspect thereof may be implemented in the context of the architecture and functionality of the embodiments described herein. The data backup technique 4B00 or any aspect thereof may be implemented in any environment.

The embodiment shown in FIG. 4B is merely one example of rule-based administration of a backup data protection configuration according to the herein disclosed techniques. As shown, a set of data protection configuration specifications $404_2$ describe a data protection configuration for a "server" entity identified as "dns33" and a vDisk "vd49" that are shown within the set of heterogeneous resource entities $112_4$. The data protection configuration specifications $404_2$ call for a "backup" protection action for "dns33". As can be observed, server "dns33" is located in "CA-US". As such, certain site-specific metadata associated with the server might be correspond to its current location (e.g., California). Such data, if the server were restored to another location, would not be necessary for restoration of the server.

The shown set of data protection administration rules $420_2$ indicate that for any server backup (e.g., "entity.type=="server" && protection.action=="backup""), the backup is to include "full" data, exclude backup of "site_metadata", and be stored in an "external" storage facility. The data protection administration rules might exclude site-specific data since such data might not be necessary for restoring a server.

Based at least in part on applying data protection administration rules $420_2$ to the data protection configuration specifications $404_2$, a set of entity-specific commands $436_2$ are generated. Specifically, entity-specific commands $436_2$ comprise a "backup" command for server "dns33" with various backup operation arguments, such as "exclude=site_meta" to exclude site-specific metadata in the backup. Executing entity-specific commands $436_2$ over heterogeneous resource entities $112_4$ creates a server backup 462 at an external storage facility of external storage provider 150. According to the data protection administration rules $420_2$, the backup comprises data describing a non-site-specific full resource state 443 and a set of non-site-specific full data 447 that is associated with the server "s99".

Additional snapshotting and backup scenarios are described as follows.

Figure 5A:
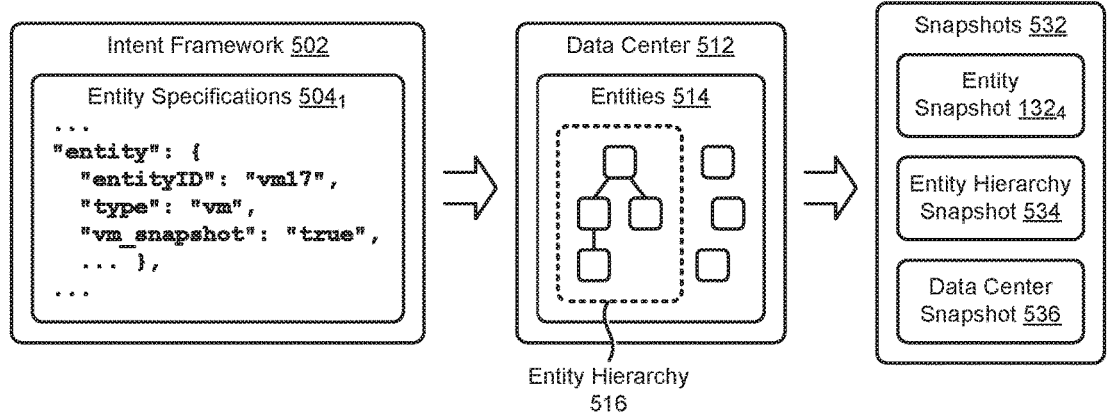
FIG. 5A presents a data snapshotting scenario as implemented in systems that facilitate rule-based administration of data protection configurations over heterogeneous resource entities in computing environments, according to some embodiments.

FIG. 5A presents a data snapshotting scenario 5A00 as implemented in systems that facilitate rule-based administration of data protection configurations over heterogeneous resource entities in computing environments. As an option, one or more variations of data snapshotting scenario 5A00 or any aspect thereof may be implemented in the context of the architecture and functionality of the embodiments described herein. The data snapshotting scenario 5A00 or any aspect thereof may be implemented in any environment.

Particular embodiments of the herein disclosed techniques may provide the ability to snapshot a data center. For each entity (e.g., entities 514) supported in a system (e.g., data center 512) which requires snapshotting, an intent framework 502 may define an entity specification (e.g., represented by entity specifications $504_1$) that comprises "<entity_name>_snapshot" (e.g., "vm_snapshot" in entity specifications $504_1$) as a first class type. This may facilitate snapshotting an entity with a deep hierarchy (e.g., entity hierarchy 516), wherein particular embodiments process the associated entities recursively or in a predetermined order to snapshot the entire entity. This may be extended to snapshot the entire data center. As shown in a set of snapshots 532, such embodiments can produce one or more instances of an entity snapshot $132_4$, one or more instances of an entity hierarchy snapshot 534, and/or one or more instances of a data center snapshot 536.

Figure 5B:
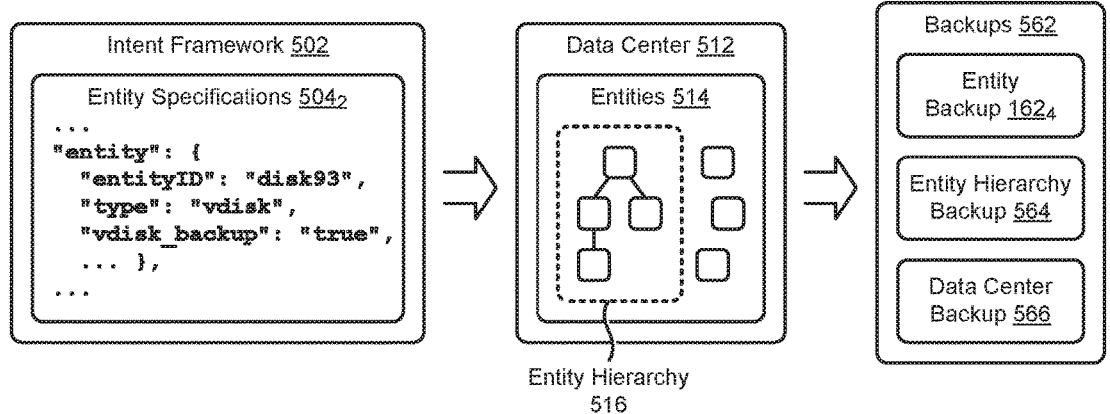
FIG. 5B presents a data backup scenario as implemented in systems that facilitate rule-based administration of data protection configurations over heterogeneous resource entities in computing environments, according to some embodiments.

FIG. 5B presents a data backup scenario 5B00 as implemented in systems that facilitate rule-based administration of data protection configurations over heterogeneous resource entities in computing environments. As an option, one or more variations of data backup scenario 5B00 or any aspect thereof may be implemented in the context of the architecture and functionality of the embodiments described herein. The data backup scenario 5B00 or any aspect thereof may be implemented in any environment.

Particular embodiments of the herein disclosed techniques may provide the ability to backup a data center. For each entity (e.g., entities 514) supported in a system (e.g., data center 512) which requires preservation of backups, an intent framework 502 may define an entity specification (e.g., represented by entity specifications $504_2$) that comprises "<entity_name>_backup" (e.g., "vdisk_backup" in entity specifications $504_2$) as a first class type. This may facilitate backup of an entity with a deep hierarchy (e.g., entity hierarchy 516), wherein particular embodiments process the associated entities recursively or in a predetermined order to backup the entire entity. This may be extended to backup the entire data center. As shown in a set of backups 562, such embodiments can produce one or more instances of an entity backup $162_4$, one or more instances of an entity hierarchy backup 564, and/or one or more instances of a data center backup 566.

The foregoing discussions pertaining to the herein disclosed techniques includes a discussion as to the control of certain information (e.g., data protection configuration specifications, data protection administration rules, etc.) by a user through a user interface. One embodiment of such a user interface is disclosed in detail as follows.

Figure 6:
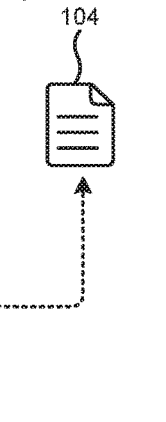
FIG. 6 presents a user interface for specifying data protection configurations, according to some embodiments.

FIG. 6 presents a user interface 600 for specifying data protection configurations. As an option, one or more variations of user interface 600 or any aspect thereof may be implemented in the context of the architecture and functionality of the embodiments described herein. The user interface 600 or any aspect thereof may be implemented in any environment.

The user interface 600 of FIG. 6 comprises a user interface window 602. As shown, a system administrator (e.g., admin 604) might interact with a set of controls at user interface window 602 to establish at least a portion of instances of data protection configuration specifications 104 and/or instances of data protection administration rules $120_{11}$. Specifically, admin 604 can establish at a least a portion of data protection configuration specifications 104 by selecting the data protection operations (e.g., "Snapshot", "Backup", etc.) that are to be associated with a list of resource entities (e.g., "vm07", "vm17", "vn11", "dns33", etc.) accessible by admin 604. The admin 604 can further select certain "Snapshot Options" (e.g., "Incremental", "Internal", "Daily", etc.) and/or "Backup Options" (e.g., "Full", "External", "Weekly", etc.) for a particular "Entity Type" (e.g., "Virtual Machine"). Such selections can be codified in the logic of data protection administration rules $120_{11}$. As further shown in user interface window 602, admin 604 can exercise the extensibility of the herein disclosed techniques by adding new entity types (e.g., by clicking "+Add new type") as they are created.

The foregoing discussion describes the herein disclosed techniques as implemented in a computing system or computing environment. A distributed virtualization computing environment in which embodiments of the present disclosure can be implemented is disclosed as follows.

Figure 7:
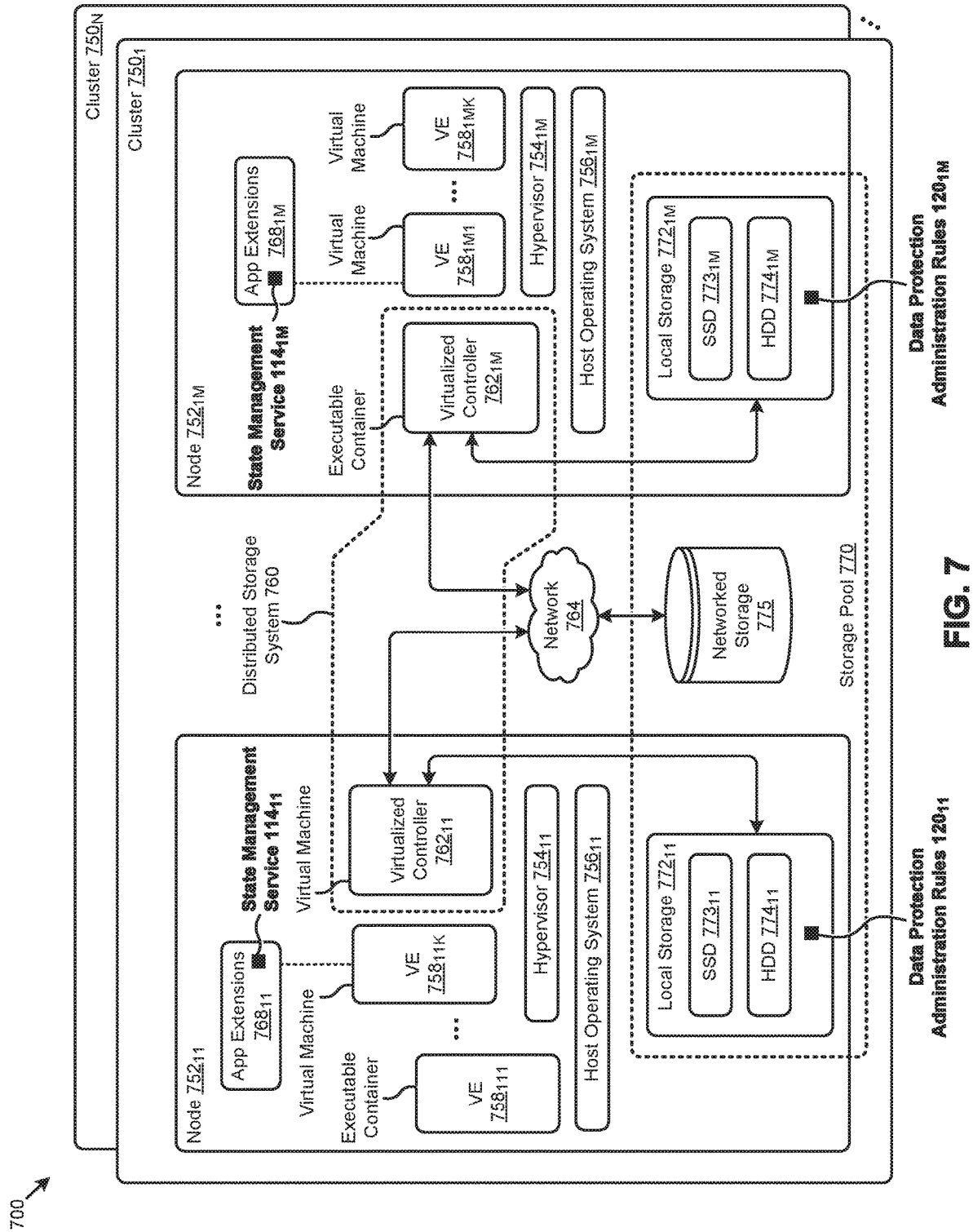
FIG. 7 presents a distributed virtualization system in which embodiments of the present disclosure can be implemented.

FIG. 7 presents a distributed virtualization environment 700 in which embodiments of the present disclosure can be implemented. As an option, one or more variations of distributed virtualization environment 700 or any aspect thereof may be implemented in the context of the architecture and functionality of the embodiments described herein. The distributed virtualization environment 700 or any aspect thereof may be implemented in any environment.

The shown distributed virtualization environment depicts various components associated with one instance of a distributed virtualization system (e.g., hyperconverged distributed system) comprising a distributed storage system 760 that can be used to implement the herein disclosed techniques. Specifically, the distributed virtualization environment 700 comprises multiple clusters (e.g., cluster $750_1$, . . . , cluster $750_N$) comprising multiple nodes that have multiple tiers of storage in a storage pool. Representative nodes (e.g., node $752_{11}$, . . . , node $752_{1M}$) and storage pool 770 associated with cluster $750_1$ are shown. Each node can be associated with one server, multiple servers, or portions of a server. The nodes can be associated (e.g., logically and/or physically) with clusters. As shown, multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}$, . . . , local storage $772_{1M}$). For example, local storage can be within or directly attached to a server and/or appliance associated with the nodes. Such local storage can include solid state drives (SSD $773_{11}$, . . . , SSD $773_{1M}$), hard disk drives (HDD $774_{11}$, . . . , HDD $774_{1M}$), and/or other storage devices.

As shown, the nodes in distributed virtualization environment 700 can implement one or more user virtualized entities (e.g., VE $758_{111}$, . . . , VE $758_{11K}$, . . . , VE $758_{1M1}$, . . . , VE $758_{1MK}$), such as virtual machines (VMs) and/or containers. VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}$, . . . , host operating system $756_{1M}$), while the VMs run multiple applications on various respective guest operating systems. Such flexibility can be facilitated at least in part by a hypervisor (e.g., hypervisor $754_{11}$, hypervisor $754_{1M}$), which hypervisor is logically located between various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at nodes in an operating system virtualization environment or container virtualization environment. Containers comprise groups of processes and/or resources (e.g., memory, CPU, disk, etc.) that are isolated from the node host computer and other containers. Such containers directly interface with the kernel of the host operating system (e.g., host operating system $756_{11}$, . . . , host operating system $756_{1M}$) without, in most cases, a hypervisor layer. This lightweight implementation can facilitate efficient distribution of certain software components, such as applications or services (e.g., micro-services). As shown, distributed virtualization environment 700 can implement both a hypervisor-assisted virtualization environment and a container virtualization environment for various purposes.

Distributed virtualization environment 700 also comprises at least one instance of a virtualized controller to facilitate access to storage pool 770 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form distributed storage system 760 which can, among other operations, manage storage pool 770. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $752_{11}$ can interface with a controller virtual machine (e.g., virtualized controller $762_{11}$) through hypervisor $754_{11}$ to access the storage pool 770. In such cases, the controller virtual machine is not formed as part of specific implementations of a given hypervisor. Instead, the controller virtual machine can run as a virtual machine above the hypervisor at various node host computers. When the controller virtual machines run above the hypervisors, varying virtual machine architectures and/or hypervisors can operate with distributed storage system 760.

For example, a hypervisor at one node in distributed storage system 760 might correspond to VMware ESXi software, and a hypervisor at another node in distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of a state management service comprising a respective set of resource-specific management agents can be implemented in the distributed virtualization environment 700 to facilitate the herein disclosed techniques. In certain embodiments, the state management service can be implemented as an application extension (e.g., app extension) managed by a virtualized entity (e.g., VM, executable container, etc.). More specifically, the state management service might be implemented as a containerized application extension managed by a virtualized container service machine.

As shown in FIG. 7, state management service $114_{11}$ is implemented in a set of app extensions $768_{11}$ managed by VE $758_{11K}$ (e.g., a virtualized container service machine) in node $752_{11}$, and state management service $114_{1M}$ is implemented in a set of app extensions $768_{1M}$ managed by VE $758_{1M1}$ (e.g., a virtualized container service machine) in node $752_{1M}$. In other embodiments, instances of the state management service are implemented in respective instances of the virtualized controller. Such instances of the virtualized controller, the state management service, the resource-specific management agents, the app extensions, and/or the virtualized service machines can be implemented in any node in any cluster. Actions taken by one or more instances of the state management service and/or virtualized controller can apply to a node (or between nodes), and/or to a cluster (or between clusters), and/or between any resources or subsystems accessible by the virtualized controller or their agents (e.g., state management service, resource-specific management agents, etc.).

As further shown, the metadata and datastores associated with the herein disclosed techniques can be stored in various storage facilities in storage pool 770. As an example, an instance of the data protection administration rules (e.g., data protection administration rules $120_{11}$) might be stored at local storage $772_{11}$, and a different instance of the data protection administration rules (e.g., data protection administration rules $120_{1M}$) might be stored at local storage $772_{1M}$.

Additional Embodiments of the Disclosure

Additional Practical Application Examples

Figure 8:
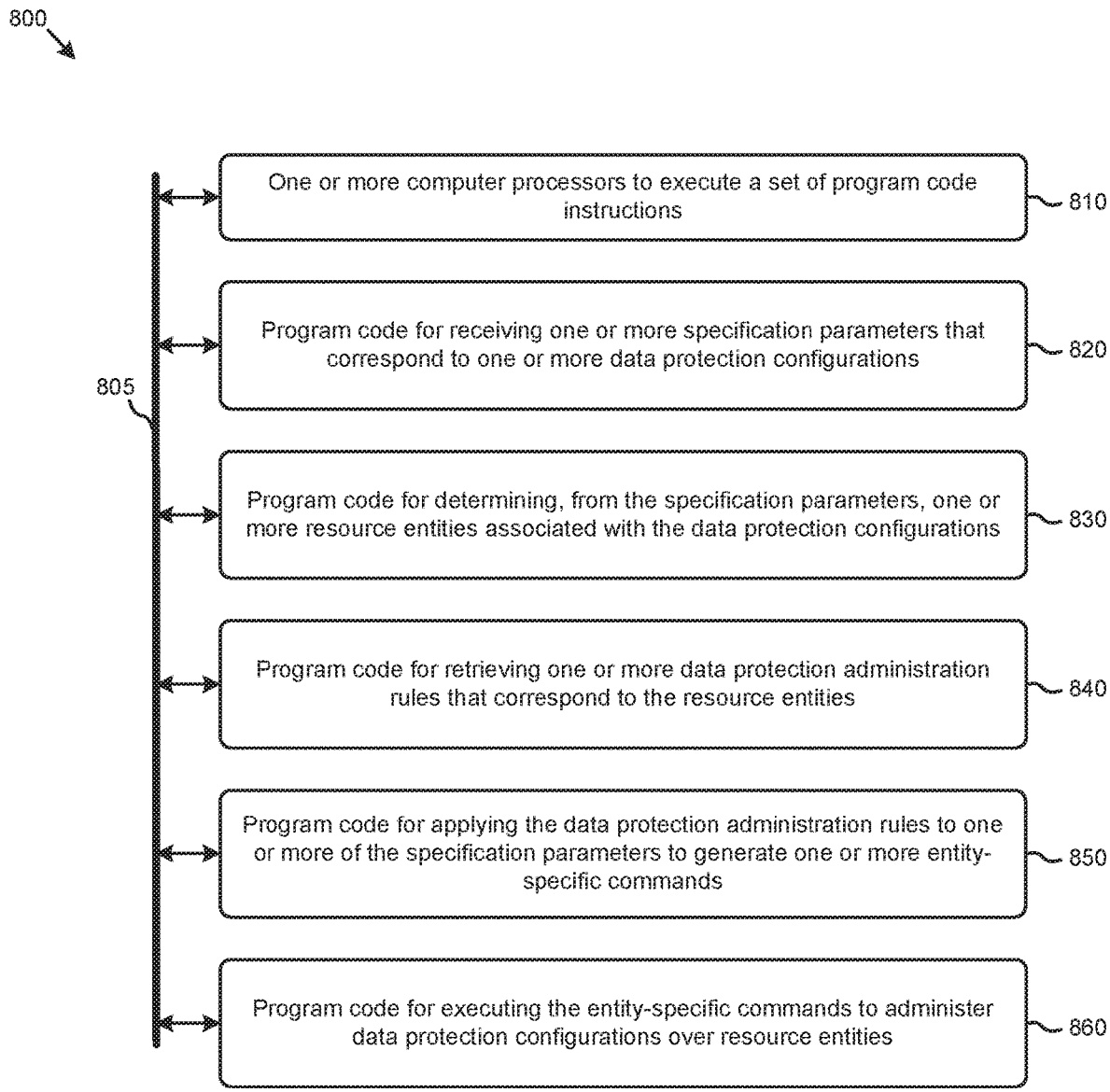
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently managing snapshotting and backup operations for large hierarchies of heterogeneous resource entities. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: receiving one or more specification parameters that correspond to one or more data protection configurations (module 820); determining, from the specification parameters, one or more resource entities associated with the data protection configurations (module 830); retrieving one or more data protection administration rules that correspond to the resource entities (module 840); applying the data protection administration rules to one or more of the specification parameters to generate one or more entity-specific commands (module 850); and executing the entity-specific commands to administer data protection configurations over the resource entities (module 860).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 9A:
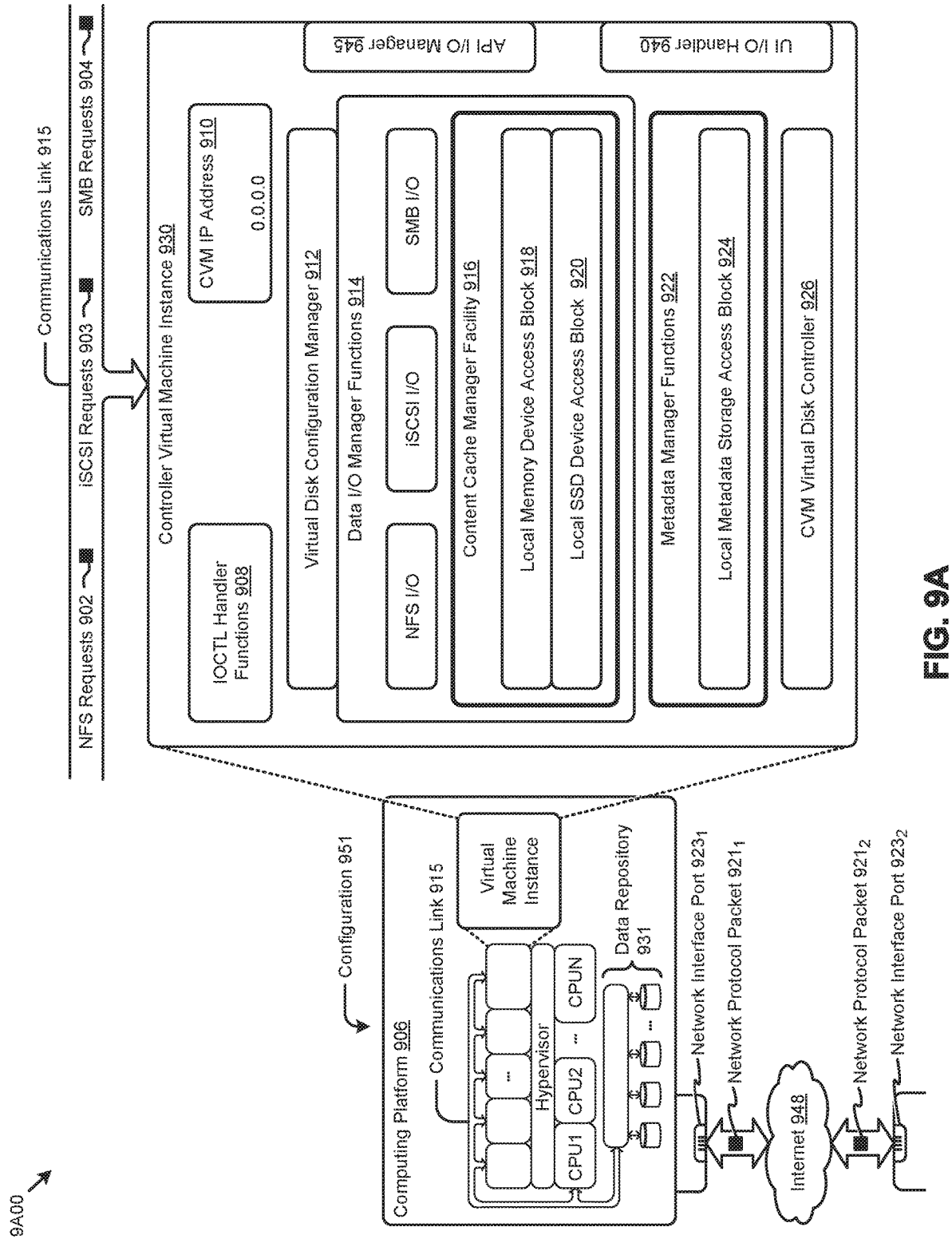
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port 923$_1$ and network interface port 923$_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet 921$_1$ and network protocol packet 921$_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to rule-based administration of data protection configurations over heterogeneous resource entities in computing environments. In some embodiments, a module may include one or more state machines and/or combinational logic used to implement or facilitate the operational and/or performance characteristics pertaining to rule-based administration of data protection configurations over heterogeneous resource entities in computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of rule-based administration of data protection configurations over heterogeneous resource entities in computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to rule-based administration of data protection configurations over heterogeneous resource entities in computing environments, and/or for improving the way data is manipulated when performing computerized operations pertaining to applying a rule base of data protection administration rules to data protection configuration specifications to determine entity-specific commands that administer data protection configurations to heterogeneous resource entities.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
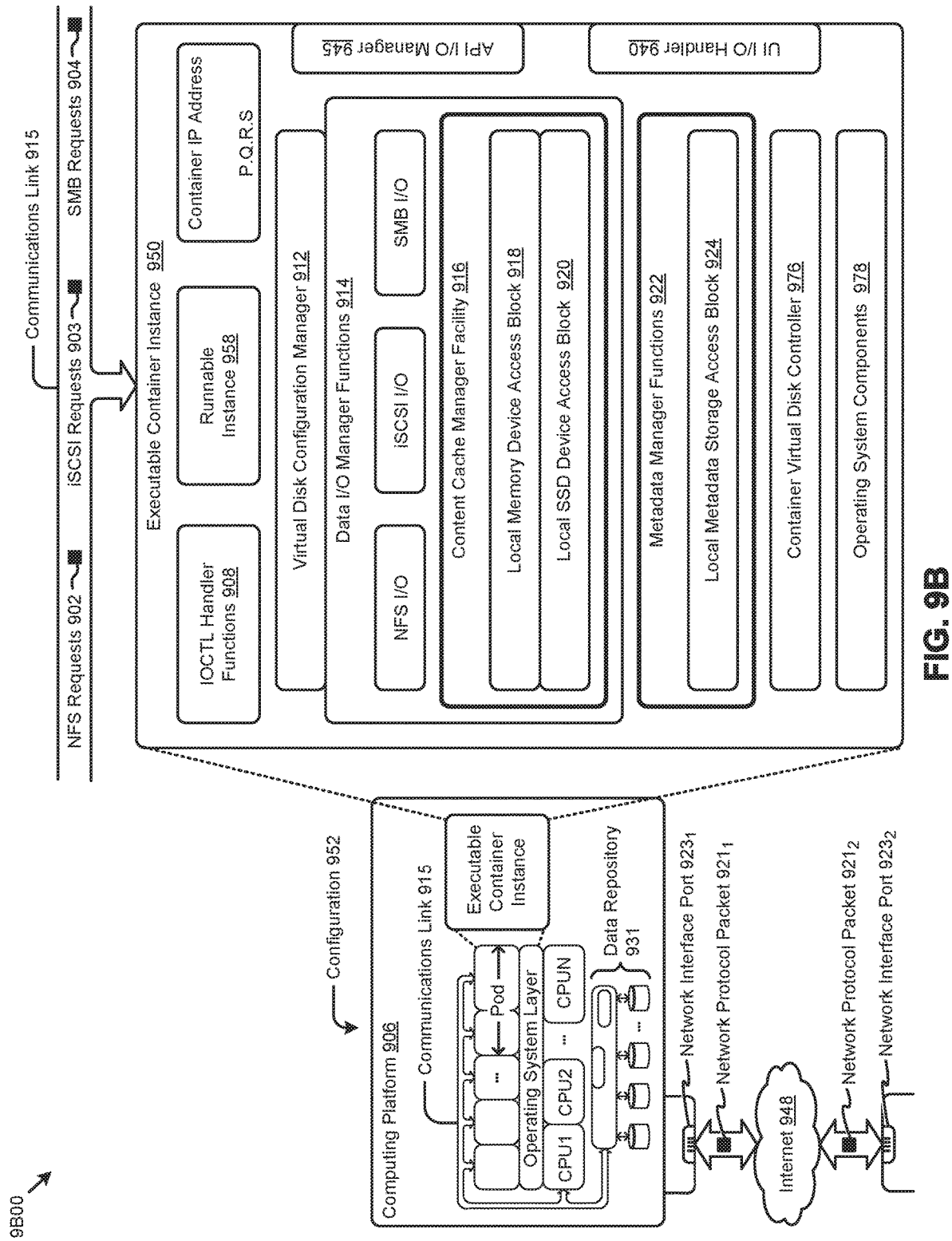

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls -a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data JO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
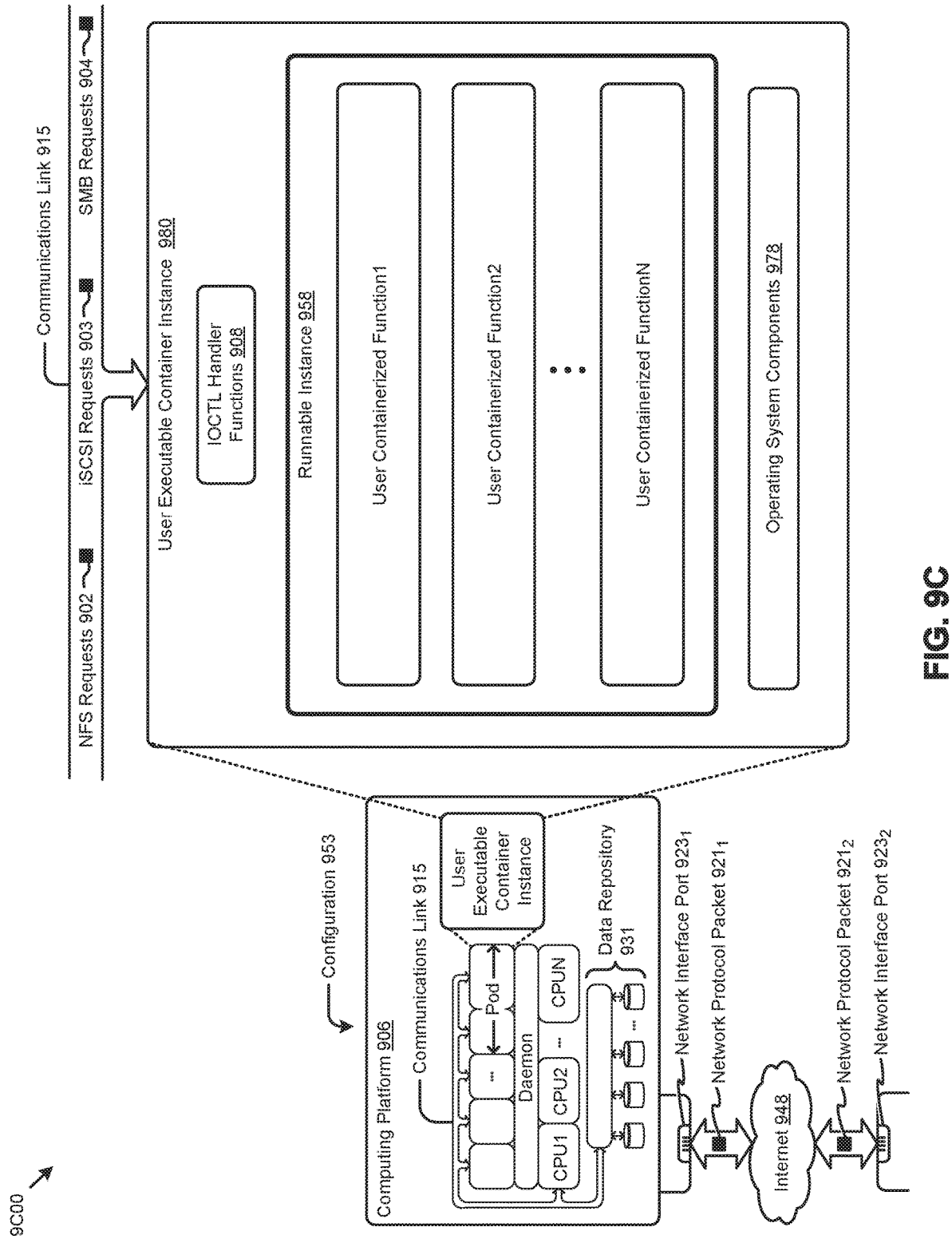

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method comprising:
receiving a specification parameter that corresponds to a data protection configuration;
determining from the specification parameter, a resource entity associated with the data protection configuration;
accessing data protection administration rules that correspond to the resource entity; and
dispatching the specification parameter to a management agent corresponding to an entity type of the resource entity; and
wherein the management agent applies the data protection administration rules to the specification parameter to generate entity-specific commands, wherein the entity-specific commands are specific to the entity type; and
wherein the management agent executes the entity-specific commands to administer the data protection configuration over the resource entity.

2. The computer-implemented method of claim 1, wherein the data protection configuration describe data protection operations.

3. The computer-implemented method of claim 2, wherein the data protection operation comprise snapshot operations, backup operations, or replication operations.

4. The computer-implemented method of claim 1, wherein the entity-specific commands refer to a target state, a then-current resource state, incremental data, or a set of full data.

5. The computer-implemented method of claim 1, wherein the entity-specific commands invoke data storage in an internal storage facility, an external storage facility, or a cloud storage facility.

6. The computer-implemented method of claim 5, wherein the entity-specific commands interact with the internal storage facility or the external storage facility, or the cloud storage facility through at least one API (Application Programming Interface).

7. The computer-implemented method of claim 1, wherein at least a portion of the data protection configuration, or the data protection administration rules, is specified at a user interface.

8. A computer readable medium, embodied in a non-transitory computer readable medium, the non-transitory computer readable medium having stored thereon a sequence of instructions which, when stored in memory and executed by a processor causes the processor to perform a set of acts, the acts comprising:
receiving a specification parameter that corresponds to a data protection configuration;
determining, from the specification parameter, a resource entity associated with the data protection configuration;

accessing data protection administration rules that correspond to the resource entity; and dispatching the specification parameter to a management agent corresponding to an entity type of the resource entity;

wherein the management agent applies the data protection administration rules to the specification parameter to generate entity-specific commands and executes the entity-specific commands to administer the data protection configuration over the resource entity.

9. The computer readable medium of claim 8, wherein the data protection configuration describe data protection operations.

10. The computer readable medium of claim 9, wherein the data protection operations comprise snapshot operations, backup operations, or replication operations.

11. The computer readable medium of claim 8, wherein the entity-specific commands refer to a target state, a then-current resource state, an incremental data, or a set of full data.

12. The computer readable medium of claim 8, wherein the entity-specific commands invoke data storage in an internal storage facility, or an external storage facility, or a cloud storage facility.

13. A system comprising:
a storage medium having stored thereon a sequence of instructions; and
a processor that executes the instructions to cause the processor to perform a set of acts, the acts comprising:
receiving a specification parameter that corresponds to a data protection configuration;
determining, from the specification parameter, a resource entity associated with the data protection configuration;
accessing data protection administration rules that correspond to the resource entity; and
dispatching the specification parameter to a management agent corresponding to a respective entity type;
wherein the management agent applies the data protection administration rules to the specification parameter to generate entity-specific commands and executes the entity-specific commands to administer the data protection configuration over the resource entity.

14. The system of claim 13, wherein the data protection configuration include snapshot operations, backup operations, or replication operations.

15. The system of claim 13, wherein the entity-specific commands refer to a target state, a then-current resource state, incremental data, or a set of full data.

16. The system of claim 13, wherein the entity-specific commands are performed over a hierarchy of child resource entities associated with a parent resource entity.

17. The system of claim 13, wherein the entity-specific commands invoke data storage in an internal storage facility, an external storage facility, or a cloud storage facility.

18. The system of claim 17, wherein the entity-specific commands interact with the internal storage facility or the external storage facility, or the cloud storage facility through at least one API (Application Programming Interface).

19. A computer-implemented method comprising:
receiving a specification parameter that corresponds to a data protection configuration;
determining, from the specification parameter, a resource entity associated with the data protection configuration;
accessing data protection administration rules that correspond to the resource entity;
wherein a management agent applies the data protection administration rules to the specification parameter to generate entity-specific commands, wherein the entity-specific commands are specific to an entity type; and
wherein the management agent executes the entity-specific commands to administer the data protection configuration over the resource entity, wherein the entity-specific commands are performed over a hierarchy of child resource entities associated with a parent resource entity.

20. The computer-implemented method of claim 19, wherein the data protection configuration comprise snapshot operations, backup operations, or replication operations.

21. The computer-implemented method of claim 19, wherein the entity-specific commands refer to a target state, a then-current resource state, incremental data, or a set of full data.

22. The computer-implemented method of claim 19, wherein the entity-specific commands invoke data storage in an internal storage facility, an external storage facility, or a cloud storage facility.

23. The computer-implemented method of claim 22, wherein the entity-specific commands interact with the internal storage facility or the external storage facility, or the cloud storage facility through at least one API (Application Programming Interface).

24. A computer readable medium, embodied in a non-transitory computer readable medium, the non-transitory computer readable medium having stored thereon a sequence of instructions which, when stored in memory and executed by a processor causes the processor to perform a set of acts, the acts comprising:
receiving a specification parameter that corresponds to a data protection configuration;
determining, from the specification parameter, a resource entity associated with the data protection configuration;
accessing data protection administration rules that correspond to the resource entity;
wherein a management agent applies the data protection administration rules to the specification parameter to generate entity-specific commands and executes the entity-specific commands to administer the data protection configuration over the resource entity,
wherein the entity-specific commands are performed over a hierarchy of child resource entities associated with a parent resource entity.

25. The computer readable medium of claim 24, wherein the data protection configuration comprise snapshot operations, backup operations, or replication operations.

26. The computer readable medium of claim 24, wherein the entity-specific commands refer to a target state, a then-current resource state, incremental data, or a set of full data.

27. The computer readable medium of claim 24, wherein the entity-specific commands invoke data storage in an internal storage facility, an external storage facility, or a cloud storage facility.

28. The computer readable medium of claim 27, wherein the entity-specific commands interact with the internal storage facility or the external storage facility, or the cloud storage facility through at least one API (Application Programming Interface).

* * * * *